United States Patent

[11] 3,603,991

| [72] | Inventors | Allen Bernstein |
| | | Framingham, Mass.; |
| | | Stephen N. Miller, Haifa, Israel |
| [21] | Appl. No. | 870,078 |
| [22] | Filed | Oct. 30, 1969 |
| [45] | Patented | Sept. 7, 1971 |
| [73] | Assignee | Raytheon Company |
| | | Lexington, Mass. |

[54] RADAR FREQUENCY SPECTRUM CONTROL CIRCUIT
5 Claims, 3 Drawing Figs.

[52] U.S. Cl. ................................................. 343/5 R, 343/17.1 R
[51] Int. Cl. ................................................. G01s 9/02
[50] Field of Search ................................................. 343/5, 17.1

[56] References Cited
UNITED STATES PATENTS

| 2,748,352 | 5/1956 | Miller | 343/5 |
| 2,961,656 | 11/1960 | Gipe | 343/5 X |
| 3,458,817 | 7/1969 | Cooper et al. | 343/17.1 X |

*Primary Examiner*—Malcolm F. Hubler
*Attorneys*—Philip J. McFarland and Joseph D. Pannone

THIS APPLICATION FILED UNDER RULE 47

ABSTRACT: A pulse radar system wherein the frequency spectrum of each transmitted signal is narrower than the frequency spectrum of each pulse of radio frequency energy produced by the system's power oscillator. The desired narrowing is accomplished by providing a microwave switch in the transmission line between the power oscillator and the antenna, such switch being actuated during the "rise time" and the "fall time" of each pulse out of the power oscillator to divert substantially all the power from the antenna during such times.

INVENTORS
ALLEN BERNSTEIN
STEPHEN N. MILLER

RADAR FREQUENCY SPECTRUM CONTROL CIRCUIT

BACKGROUND OF THE INVENTION

It has been recognized for many years that, unless special precautions are taken, pulse radar systems may transmit, along with the desired pulse signal having a predetermined frequency, spurious signals within a rather broad spectrum of frequencies. With the proliferation of radar systems of relatively high power, the transmission of such spurious signals has led to serious operational difficulties. That is, mutual interference between radar systems has become a problem of significant import.

In an effort to ameliorate the problem, cognizant authorities have promulgated regulations limited the power level of spurious signals from any radar system to an absolute level. While such regulations have been of value in reducing mutual interference between systems, it is obvious that such measures are, at best, simply palliative. It is, of course, far to be preferred that the root causes of spurious signals be determined and measures be taken to reduce such signals.

The problem of frequency spreading is of particular difficulty when a self-excited oscillator, as a magnetron, is used by reason of the fact that such oscillators cannot be operated to "turn on" or "turn off" instantaneously. For example, if it be desired to pulse a magnetron for a period nominally of 2 $\mu$sec, it is necessary to allow for a 0.25 $\mu$sec "rise time" (during which period oscillations of the proper mode are built up) and a 0.25 $\mu$sec "fall time" (during which period oscillations decay). In the normal situation, the required "rise" and "fall times" are provided for by shaping the modulator pulse so that the anode potential does not instantaneously jump from one extreme to the other, but rather is increased, or decreased, at a finite rate. Unfortunately, however, such a change gives rise to frequency pushing.

It has been proposed to provide a narrow band-pass filter in the output line from a power oscillator to control the transmitted frequency spectrum. The theory underlying such an approach is that such a filter will permit only signals within a preselected frequency band to be radiated while suppressing any "out-of-band" signals which may be generated by the power oscillator. For example, well known cavity resonators, which are of some utility for this purpose, require that: (1) the peak power of the radiated pulse be lower than such power would otherwise have to be; and (2) means be provided to match, critically, the resonant frequency of the cavity to the desired operating frequency of the magnetron.

Therefore, it is a primary object of this invention to provide improved means for reducing the width of the frequency spectrum of transmitted signals from a pulsed oscillator radar system.

Another object of this invention is to provide improved means as above which operates automatically to reduce such spectrum regardless of the width thereof.

Still another object of this invention is to provide improved means as above which, once installed, may be operated under widely varying varying conditions without requiring critical adjustments.

SUMMARY OF THE INVENTION

These and other objects of this invention are attained generally by providing, in the transmission line between the power oscillator and the antenna, a microwave switch which is actuated in synchronism with each pulse of radio frequency energy so as to divert substantially all of such energy to a matched load during the "rise time" and "fall time" of each such pulse.

BRIEF DESCRIPTION OF THE DRAWINGS

For a more complete understanding of this invention, reference is now made to the following description of the drawings, in which.

DESCRIPTION OF THE PREFERRED EMBODIMENTS

Figure 1:
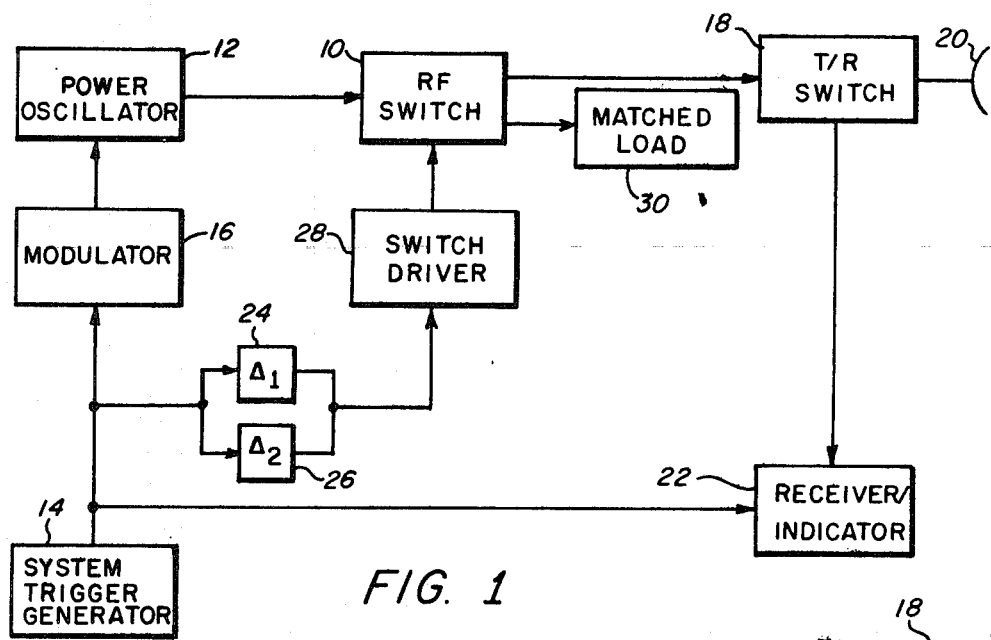
FIG. 1 is a block diagram of one embodiment of this invention wherein the synchronization of the microwave switching to each pulse of radio frequency energy generated is controlled by the system trigger generator.

Referring to FIG. 1 it may be seen that a radar system according to this invention may be made by placing a radio frequency switch 10 (which will be described in detail hereinafter) in the path of radio frequency energy from a power oscillator 12 and by providing an appropriate switch actuating arrangement (not numbered). To complete the system the system trigger generator 14, a modulator 16, a transmit/receive switch 18, an antenna 20 and a receiver/indicator 22, each of which may be of conventional construction, are connected as shown.

While the invention may be used with any type of power oscillator, it is specifically intended that the power oscillator 12 include a magnetron. As is well known, four parameters determine the operation of such a device. These parameters are (1) magnetic field, (2) anode current (or anode voltage), (3) load conductance, and (4) load susceptance. In any given application, all of the parameters except the second are invariable. It is evident that the power output and the frequency of the magnetron in the power oscillator 12 must change during each operating period. The particular way in which such a change occurs is, of course, dependent in the characteristics of the particular magnetron used and the shape of the pulse of the modulator 16. For example, when the length of the pulse out of the magnetron is normally 2 microseconds there is a "rise time" and a "fall time" of about 0.25 microseconds during each of which time the frequency of the output signal varies appreciably from the desired frequency. Further, the signal out of the magnetron occurs at a fixed known time interval after the occurrence of each system trigger out of synchronized system trigger generator 14.

The operation of the rf switch 10 is synchronized with the "rise time" and the "fall time". Thus, a delay element 24 and a delay element 26 are connected by the output line of the system trigger generator 14 and a switch driver 28 as shown. Delay element 24 delays the trigger pulses by an interval of time equal to the delay of the end of the "rise time" of the power oscillator 12 while delay element 26 delays the trigger pulses by an interval of time equal to the delay of the start of the "fall time" of the power oscillator 12. As a result, the switch driver 28 is caused to actuate the rf switch 10 so as to divert radio frequency energy passing therethrough from the line (unnumbered) to a matched load 30 during the "rise" and "fall times".

Figure 2:
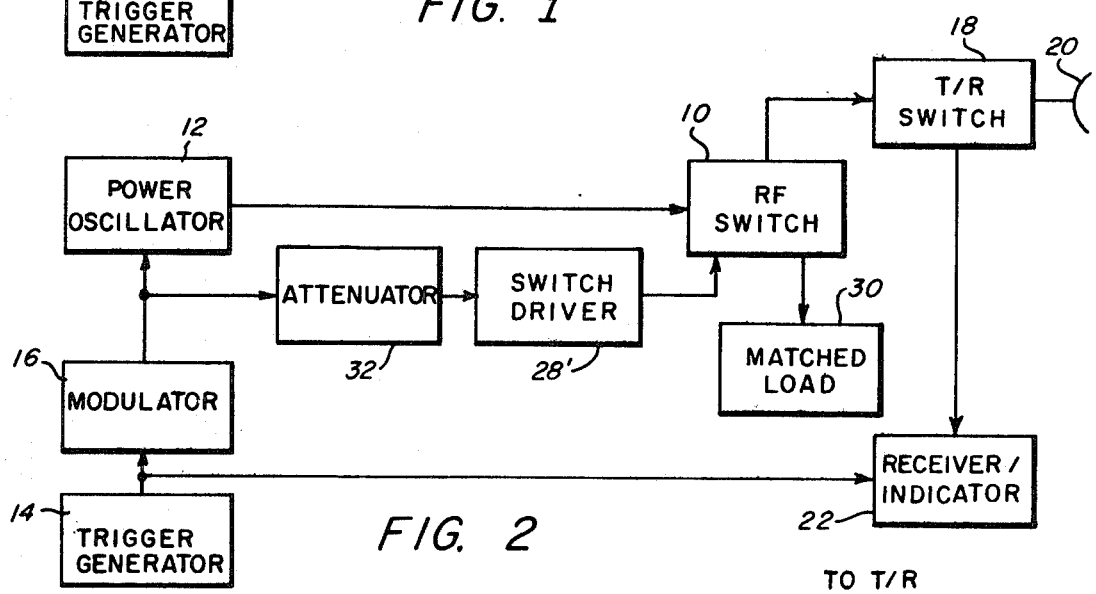
FIG. 2 is a block diagram of a second embodiment of this invention wherein the synchronization of the microwave switching to each pulse of radio frequency energy is controlled by the modulator waveform; and, FIG. 3 is an exemplary microwave switch adapted to operate in either embodiment.

Referring now to FIG. 2, an alternative arrangement for actuating the rf switch 10 includes an attenuator 32 connected by the output line of the modulator 16 and a switch driver 28'. The later element is actuated when the amplitude of the output signal from the modulator 16 reaches some convenient level, as 80 to 90 percent of its maximum. When the switch 28' is actuated the rf switch 10 in turn is actuated to direct radio frequency energy into the line (unnumbered) to the transmit/receive switch 18. During the "fall time" when the amplitude of the signal out of the modulator 16 reaches the selected level, switch driver 28' is returned to its normal or quiescent state, thereby causing the rf switch 10 to direct radio frequency energy to the matched load 30.

Alternatively, the system could be reconfigured to have the quiescent state of rf switch 10 result in transmission of rf energy to T/R switch 18.

Figure 3:
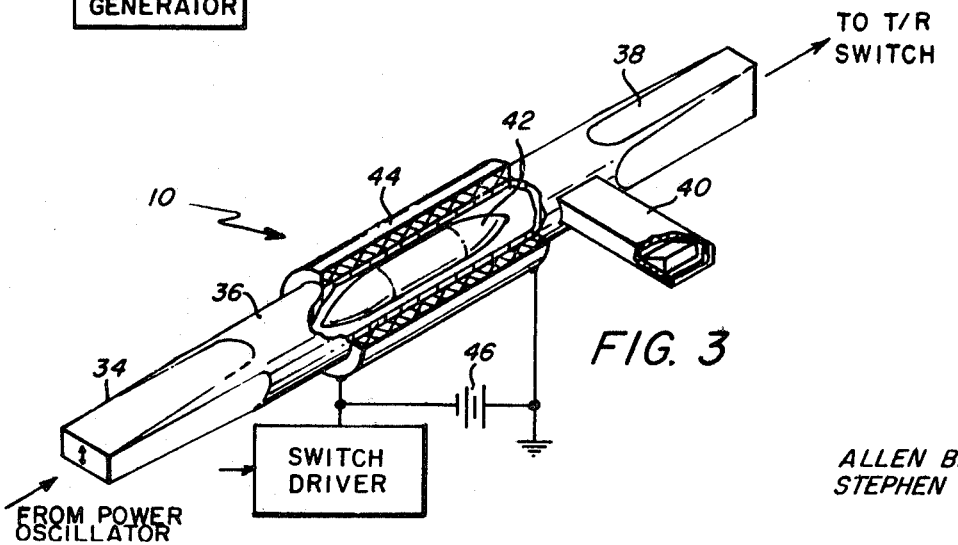

Referring now to FIG. 3, an rf switch which is adapted to use in this invention is illustrated. It may be seen that the switch in essence is a nonreciprocal microwave network of the type commonly designated as a Faraday rotator. The network includes a first rectangular waveguide 34, a circular waveguide 36 and a first rectangular waveguide 38 joined in a conventional manner so that a smooth transition from the various waveguides is attained. The first and second rectangular waveguides 34 and 38 are proportioned to accept and propagate only plane waves in which the component of the electric vector is parallel to the smaller dimension of each section. That is, the first and second rectangular waveguides 34, 38 are proportioned to transmit the dominant $TE_{10}$ mode. Further, waveguides 34 and 38 are oriented orthogonally. The circular waveguide 36 is dimensioned so that only the wave polarizations of the dominant $TE_{11}$ mode may be propagated through it. A rectangular stub 40, of the same dimensions as the rectangular waveguides 34, 38, is oriented orthogonally to rectangular waveguide 38, thereby being coupled by way of a shunt plane junction to the circular waveguide 36. A matched load of conventional construction is supported in the stub. 40. A Faraday effect element 42 is supported within the circular waveguide 36 in any convenient way (not shown). A solenoid 44 arranged to produce a longitudinal magnetic field in Faraday effect element 42 is supported on the circular waveguide 36. The solenoid 44 is connected to a biasing source 46 (which source is preferably variable) and to the switch driver 28 or 28' as shown. The rf switch 10 operates in the following manner. When a signal, regardless of its frequency, is generated by the power oscillator the $TE_{10}$ mode is propagated through the first rectangular waveguide 34 to the circular waveguide 36. In the absence of a signal from the switch driver 28 or 28' the magnetic field of the solenoid 44 is of such direction and intensity as to permit the Faraday effect element 42 to rotate the plane of polarization of the energy in the circular waveguide 36 so that such energy is coupled to the stub 40. When such a condition obtains, there is no coupling between the circular waveguide 36 and the second rectangular waveguide 38. In other words, all the energy from the power oscillator 12 is diverted through the stub 40 to the matched load 30. Such energy is, as is well known, absorbed in such a load. When, however, the switch driver 28, 28' is actuated, the resultant magnetic field of the solenoid 44 is such as to cause the Faraday effect element 42 to rotate the plane of polarization of the energy in the circular waveguide by 90°. It is evident, therefore, that under these conditions stub 40 is decoupled from the second rectangular waveguide 38 is coupled to the circular waveguide 36.

In other words, when a signal from the switch driver 28 or 28' is impressed on the Faraday effect element 42 radio frequency energy from the power oscillator 12 is passed, via the T/R switch 18, to the antenna 20 for radiation therefrom. It is also evident that because the operation of the rf switch 10 may not be instantaneous, there is some shaping of the envelope of the radiated energy.

While the disclosed embodiments of the invention utilize a Faraday effect element as a radio frequency switch, it will be obvious to one skilled in the art that other types of radio frequency switches may be used. For example, gas filled tubes of a nature similar to the tube used as the T/R switch, semiconductor elements as pin diodes or "multipactors" may replace the Faraday effect element 42. Substitution of any such switches for the Faraday effect element 42 would, of course, require changes in the control circuits, i.e., the switch driver 28, 28', but such changes are deemed to be so well known that illustration thereof is not required. It will also be obvious to one skilled in the art that the disclosed switching arrangement may be modified by using several Faraday effect elements in parallel.

What is claimed is:

1. A radar system including an antenna from which pulses of radio frequency energy are radiated, the frequency of such energy being substantially constant within each one of such pulses, such system comprising:
    a. a power oscillator, responsive to modulation signals having a finite rise time and a finite fall time, for generating pulses of radio frequency energy, the frequency of the energy within each one of such pulses varying during the rise time and the fall time thereof; and
    b. control means, synchronized with the modulation signals, for diverting substantially all of the radio frequency energy produced by the power oscillator during the rise time and the fall time of each one of the pulses of such energy from the antenna.

2. A radar system as in claim 1 wherein the control means includes a Faraday effect element.

3. In a radar system utilizing a magnetron to produce pulses of radio frequency energy, each one of such pulses having a finite rise time and a finite fall time during each of which the frequency of the radio frequency energy produced varies from a desired frequency, and an antenna for radiating a portion of the radio frequency energy produced by such magnetron, a frequency control circuit comprising:
    a. a microwave transmission network disposed between the magnetron and the antenna, such network including a microwave switch:
    b. switch control means, operative during the rise time and the fall time of each one of the pulses of radio frequency energy from the magnetron, for actuating the microwave switch to divert substantially all of the radio frequency energy from the magnetron during each such time from the antenna.

4. A frequency control circuit as in claim 3 wherein the microwave transmission network comprises:
    a. a first rectangular waveguide having one end thereof connected to the magnetron and the second end thereof connected to one end of a circular waveguide, such first rectangular waveguide being dimensioned to propagate only the dominant mode of energy from the magnetron;
    b. a Faraday effect element disposed within the circular waveguide and an energizing coil disposed about the circular waveguide.
    c. a second and a third rectangular waveguide, each having one end thereof connected to the circular waveguide and spaced one from each other about the periphery of such waveguide, the second and the third rectangular waveguide being dimensioned similarly to the first rectangular waveguide;
    d. means for connecting the second end of the second rectangular waveguide to the antenna; and
    e. a matched load disposed in the third rectangular waveguide.

5. A frequency control circuit as in claim 4 wherein the switch control means includes:
    a. a first and a second delay line, each responsive to each system trigger pulse to delay each such pulse by an amount of time to produce a delay pulse at the end of the rise time of each pulse of radio frequency energy out of the magnetron and at the beginning of the fall time of each such pulse; and,
    b. an amplifier, responsive to each delayed pulse, for generating a control signal for the energizing coil whereby the latter causes the Faraday effect element to rotate the plane of polarization of the radio frequency energy in the circular waveguide to couple such energy to the second rectangular waveguide between the occurrence of the delayed pulses.